(12) United States Patent
Bateman

(10) Patent No.: US 6,628,440 B1
(45) Date of Patent: Sep. 30, 2003

(54) SYSTEM FOR DIVERTING AN OPTICAL COMPONENT SIGNAL FROM A MULTIPLEXED OPTICAL SIGNAL

(75) Inventor: R. James Bateman, New Milford, CT (US)

(73) Assignee: Spirent Communications of Rockville, Inc., Rockville, MD (US)

(*) Notice: Subject to any disclaimer, the term of this patent is extended or adjusted under 35 U.S.C. 154(b) by 0 days.

(21) Appl. No.: 09/348,299

(22) Filed: Jul. 7, 1999

(51) Int. Cl.$^7$ ............................................. H04J 14/02
(52) U.S. Cl. ......................... 359/124; 359/128; 385/24
(58) Field of Search ............................... 359/127, 124, 359/128, 133, 135; 385/24

(56) References Cited

U.S. PATENT DOCUMENTS

| | | | |
|---|---|---|---|
| 4,707,057 A | * 11/1987 | Takahashi et al. | 350/96.12 |
| 5,086,349 A | * 2/1992 | Okayama et al. | 359/124 |
| 5,414,548 A | 5/1995 | Tachikawa et al. | 359/130 |
| 5,629,992 A | 5/1997 | Amersfoort et al. | 385/15 |
| 5,712,717 A | 1/1998 | Hamel et al. | 359/130 |
| 5,726,785 A | 3/1998 | Chawki et al. | 359/130 |
| 5,745,612 A | 4/1998 | Wang et al. | 385/24 |
| 5,748,349 A | 5/1998 | Mizrahi | 359/130 |
| 5,748,811 A | 5/1998 | Amersfoort et al. | 385/15 |
| 5,748,815 A | 5/1998 | Hamel et al. | 385/37 |
| 5,760,934 A | 6/1998 | Sutter et al. | 359/119 |
| 5,771,112 A | 6/1998 | Hamel et al. | 359/128 |
| 5,774,606 A | 6/1998 | de Barros et al. | 385/24 |
| 5,778,118 A | 7/1998 | Sridhar | 385/24 |
| 5,781,677 A | 7/1998 | Jin et al. | 385/37 |
| 5,812,291 A | 9/1998 | Bendelli et al. | 359/129 |
| 5,812,709 A | 9/1998 | Arai et al. | 385/16 |
| 5,822,095 A | 10/1998 | Taga et al. | 359/127 |
| 6,101,010 A | * 8/2000 | Konishi | 359/110 |
| 6,307,656 B2 | * 10/2001 | Terahara | 359/124 |
| 6,310,690 B1 | * 10/2001 | Cao et al. | 359/127 |
| 6,343,165 B1 | * 1/2002 | Kim et al. | 359/116 |

* cited by examiner

Primary Examiner—Brent A. Swarthout
(74) Attorney, Agent, or Firm—Katten Muchin Zavis Rosenman; Gilberto M. Villacorta; Andrew J. Bateman

(57) ABSTRACT

A system for diverting an optical component signal from a multiplexed optical signal includes an optical communications channel having a first portion and a second portion. A multiplexed optical signal having a plurality of component signals may be transmitted through the optical communications channel. Each component signal lies within a different optical bandwidth. The system also includes a branch optical channel having a first section and a second section. A signal diverter that optically couples the first portion of the communications channel to the second portion of the communications channel directs a diverted portion of the multiplexed optical signal into the first section of the branch optical channel. The signal diverter also allows a non-diverted portion of the multiplexed optical signal to propagate into the second portion of the optical communications channel. An optical wavelength separator that is optically coupled to the first section of the branch optical channel separates a selected component signal from the diverted portion of the optical signal. The optical wavelength separator also optically couples the selected component into the second section of the branch optical channel. A port that is optically coupled to the second section of the branch optical channel allows the optical coupling of an optical device to the second section of the branch optical channel.

17 Claims, 4 Drawing Sheets

SYSTEM FOR DIVERTING AN OPTICAL COMPONENT SIGNAL FROM A MULTIPLEXED OPTICAL SIGNAL

BACKGROUND OF THE INVENTION

1. Field of the Invention:

This invention relates to optical communication systems. More particularly, this invention relates to a method and apparatus for diverting an optical signal used in optical communications from a wave-length division multiplexed signal.

2. The Prior Art:

Because of the increased demands being placed on optical fiber transmission, various schemes of placing an increased number of communications on a single optical fiber have been employed in recent years. One method is time division multiplexing, in which different transmissions share the same fiber, but at different times. Another method is wave-length division multiplexing, in which different signals are modulated onto different wavelengths and are then combined to generate a signal that is transmitted over a single fiber. At the receiving end, the different wavelengths are separated, thereby regenerating the original signals.

As shown in FIG. 1, certain prior art wavelength division multiplexed optical communications systems 1 use a dense wavelength division multiplexer (DWDM) 3 to combine a plurality of signals 2, wherein each signal is centered about a different wavelength bandwidth $\lambda_1$–$\lambda_2$. The combined signal is transmitted from the DWDM 3 over an optical channel 6, such as an optical fiber, to a second DWDM 4 that is configured so at to separate the different wavelength bandwidth channels from each other, thereby rendering a reconstruction of the plurality of signals 5.

When one wants to analyze the transmission of a single wavelength transmission from such a DWDM signal, an optical add-drop multiplexer (OADM) 7 may be inserted into the optical channel 6. The OADM 7 separates from the signal a selected wavelength and transmits it to an analyzer 8.

This arrangement has the disadvantage of adding increased cost due to the plurality of OADM's that must be employed in a multi-fiber network. Furthermore, the prior art has the disadvantage in that if a single OADM fails, it could disrupt the communications of many different signals.

Nowhere does the prior art disclose a method or apparatus that allows access to an OADM'ed optical signal being transmitted over an optical fiber without interrupting the communications over the optical fiber.

SUMMARY OF THE INVENTION

The above-noted disadvantages of the prior art are overcome by the present invention, which in one aspect is a system for diverting an optical component signal from a multiplexed optical signal. The system includes an optical communications channel having a first portion and a second portion. A multiplexed optical signal having a plurality of component signals may be transmitted through the optical communications channel. Each component signal lies within a different optical bandwidth. The system also includes a branch optical channel comprising a first section and a second section. A signal diverter that optically couples the first portion of the communications channel to the second portion of the communications channel directs a diverted portion of the multiplexed optical signal into the first section of the branch optical channel. The signal diverter also allows a non-diverted portion of the multiplexed optical signal to propagate into the second portion of the optical communications channel. An optical wavelength separator that is optically coupled to the first section of the branch optical channel separates a selected component signal from the diverted portion of the optical signal. The optical wavelength separator also optically couples the selected component into the second section of the branch optical channel. A port that is optically coupled to the second section of the branch optical channel allows the optical coupling of an optical device to the second section of the branch optical channel.

Another aspect of the invention is a method of providing a component signal, of an optical signal having a plurality of wavelength component signals, to an optical device. In executing the method, a portion of the optical signal is diverted from the optical signal while allowing a substantial portion of the optical signal to propagate along an optical communications channel. A selected wavelength component signal is separated from the portion of the optical signal. Then, the selected component signal is optically coupled to an optical device.

These and other advantages will become apparent from the following description of the preferred embodiment taken in conjunction with the following drawings, although variations and modifications may be effected without departing from the spirit and scope of the novel concepts of the disclosure.

DETAILED DESCRIPTION OF THE INVENTION

Figure 1:
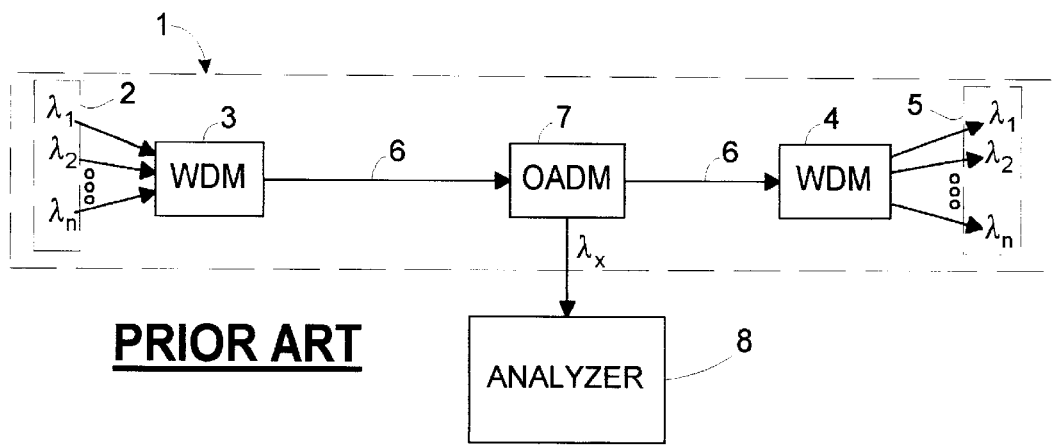
FIG. 1 is a schematic diagram of a prior art communications system.

A preferred embodiment of the invention is now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Figure 2:
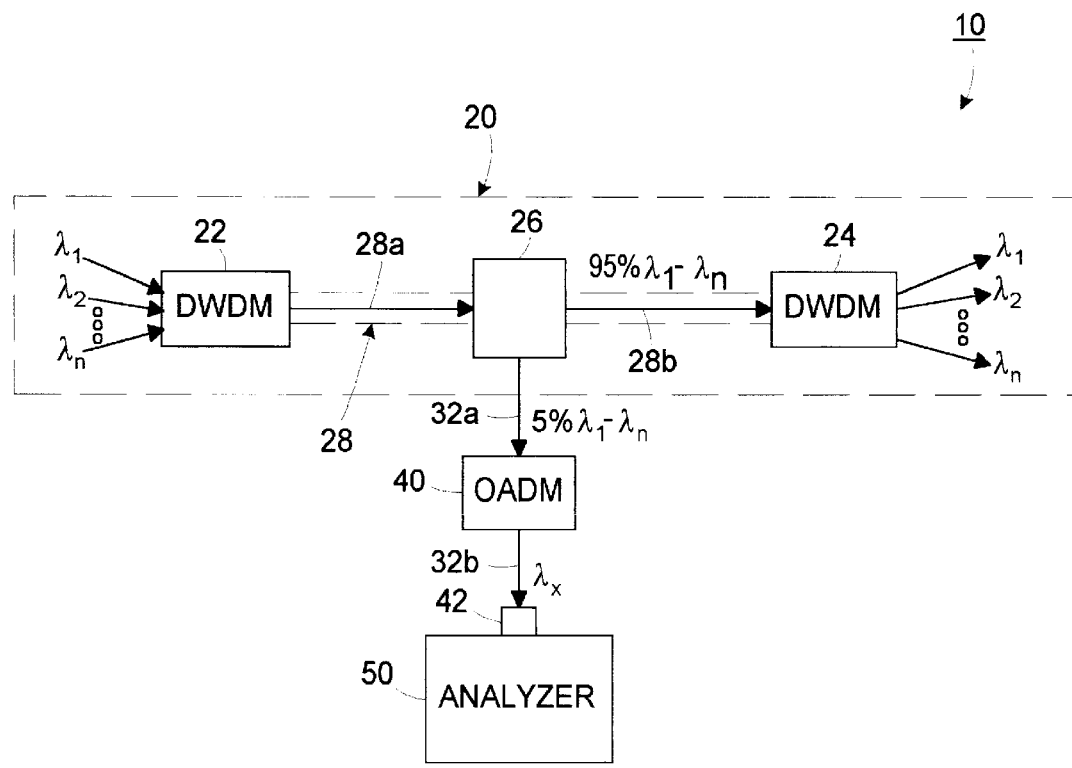
FIG. 2 is a schematic diagram of a first embodiment of the invention.

As shown in FIG. 2, in a simple embodiment, the invention is a system 10 for diverting an optical component signal from a multiplexed optical signal to a device such as an optical analyzer. The system 10 includes an optical communications unit 20. The optical communications unit 20 includes an optical channel 28, such as an optical fiber, that has a first portion 28a and a second portion 28b, optically coupled to each other by a signal diverter 26, such as a beam splitter.

A multiplexed optical signal having a plurality of component signals is transmitted through the optical communications channel 28 and each component signal lies within a different optical bandwidth $\lambda_1$–$\lambda_n$. A first optical wavelength division multiplexer 22 (such as a DWDM), that is optically coupled to the first portion 28a of the optical channel, optically couples the plurality of optical component signals into the first portion 28a of the optical communications channel. Similarly, a second optical wavelength division multiplexer 24, that is optically coupled to the second portion 28b of the optical channel, is used separate the plurality of optical component signals into a plurality of discrete signals.

Extending from the signal diverter 26 is a branch optical channel 32, such as a second optical fiber, that includes a first section 32a and a second section 32b. The a signal diverter 26 directs a diverted portion of the multiplexed optical signal (for example, 5% of the total beam) into the first section 32a of the branch optical channel. The signal diverter 26 also allows a non-diverted portion of the multiplexed optical signal (for example, the remaining 95% of the beam) to propagate into the second portion 28b of the optical communications channel.

An optical wavelength separator 40, such as an optical add-drop multiplexer, optically couples the first section 32a of the branch optical channel to the second section 32b. The optical wavelength separator 40 separates a selected component signal $\lambda_x$ from the diverted portion of the optical signal and that optically couples the selected component into the second section 32b of the branch optical channel.

A port 42 is optically coupled to the second section 32b of the branch optical channel. An optical device 50, such as an optical signal analyzer, may be optically coupled to the second section 32b of the branch optical channel.

Figure 3:
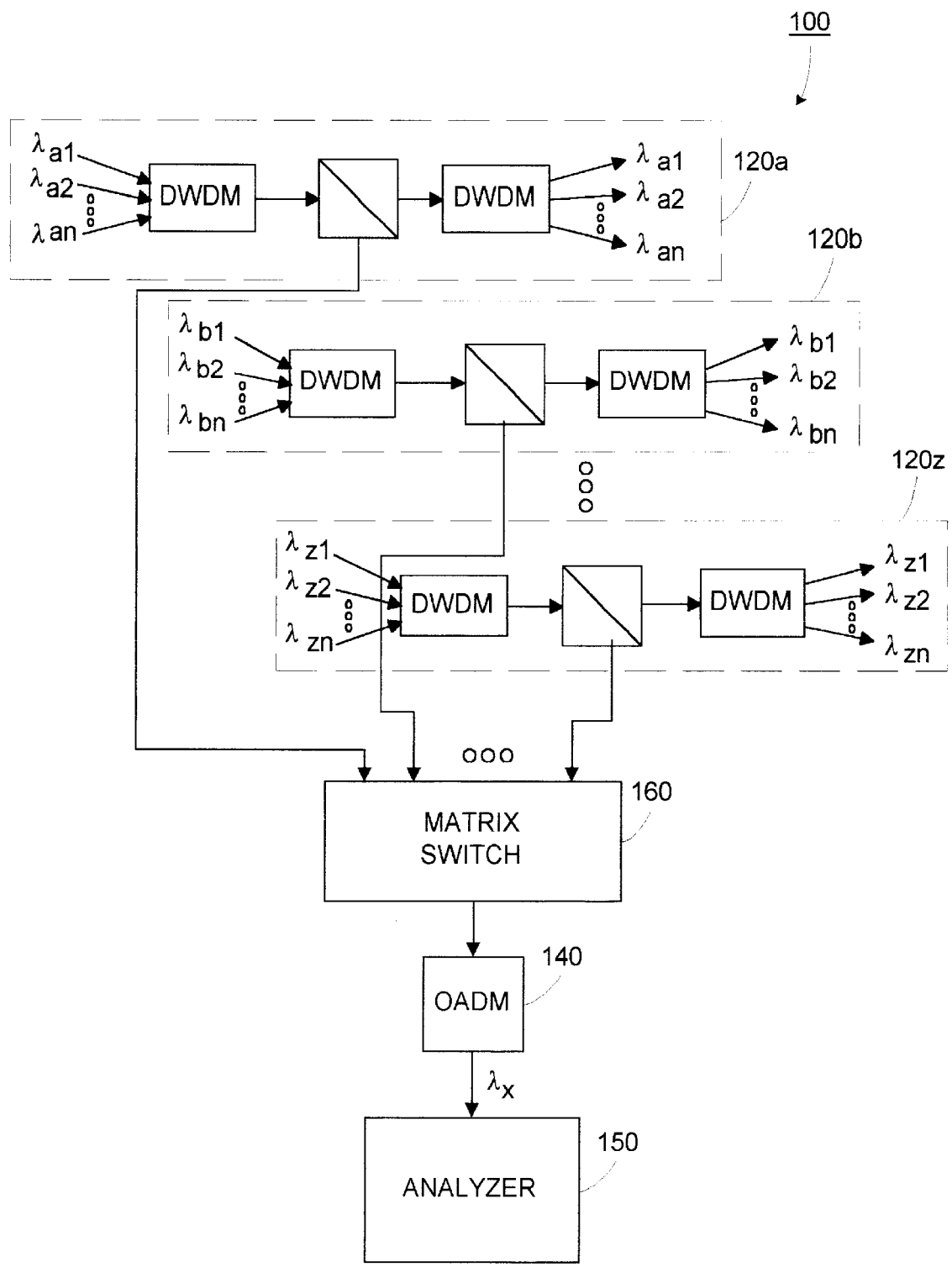
FIG. 3 is a schematic diagram of a second embodiment of the invention.

As shown in FIG. 3, in a more complex embodiment 100 of the invention, a plurality of DWDM'ed optical communication units 120a–120z are interconnected through a matrix switch 160. The matrix switch 160 transmits the diverted beam from a selected communications unit of the plurality of optical communication units 120a–120z to an OADM 140. The OADM 140 then separates a selected channel and transmits it to an optical signal analyzer 150. For example, if a technician were to want to analyze the signal corresponding to wavelength $\lambda_{b2}$, then the matrix switch 160 would be set to divert the beam from communications unit 120b to the OADM 140. The OADM would be set to separate wavelength $\lambda_{b2}$ from wavelengths $\lambda_{b1}$–$\lambda_{bn}$ and transmit $\lambda$hd b2to the analyzer 150, where the technician would analyze the signal having wavelength $\lambda_{b2}$-without interrupting any of the communications, including the one corresponding to $\lambda_{b2}$. This embodiment 100 allows savings in costs by allowing access to several optical communication unit 120 using a single OADM 140.

Figure 4:
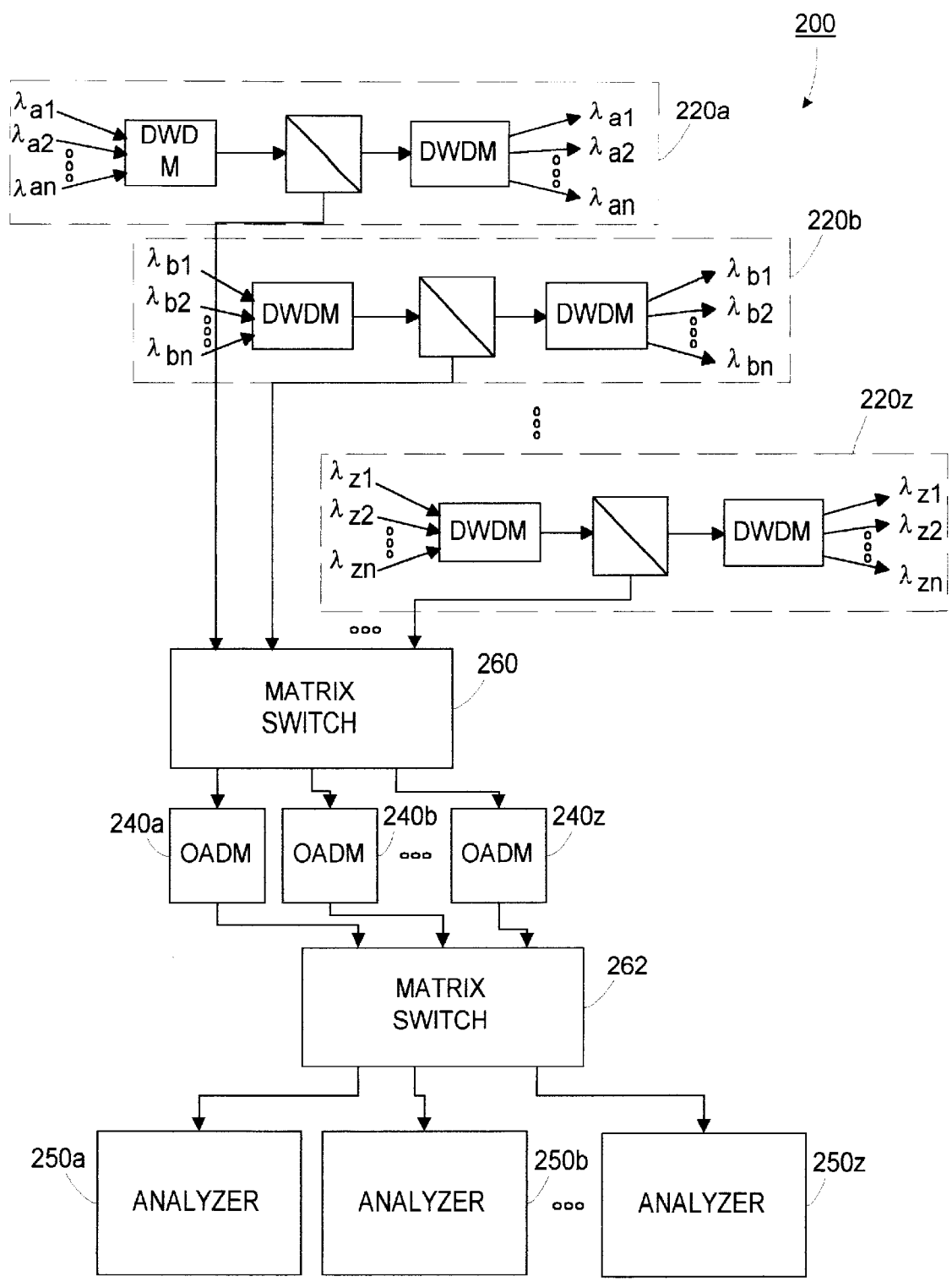
FIG. 4 is a schematic diagram of a third embodiment of the invention.

In some more complex optical communications networks, many different protocols will be transmitted as different wavelengths in the targeted fiber. Such protocols include IP, asynchronous transfer mode (ATM), SONET, etc. In such cases a still more complex embodiment 200 of the invention may be used, as shown in FIG. 4. Such an embodiment 200 may include a plurality of optical communications units 220a–z, each couplet to a first optical matrix switch 260. The first optical matrix switch 260 is optically coupled to a plurality of OADM's 240a–z (or other optical wavelength separators), so as to be able to optically couple a selected optical communications unit of the plurality of optical communications units 220a–z to a selected OADM of the plurality of OADM's 240a–z. A second matrix switch 262 is optically coupled to each of the plurality of OADM's 240a–z and to a plurality of optical analyzers 250a–z (or other optical device), so as to be able to optically couple a selected OADM of the plurality of OADM's 240a–z to a selected analyzer of the plurality of optical analyzers 250a–z. For example a WDM'ed signal from optical communications unit 220b and including a Gigabit Ethernet signal (which could be represented by $\lambda_{b2}$) could be routed through the first matrix switch 260 to a selected OADM (e.g., OADM 240a). The selected OADM 240a would separate the Gigabit Ethernet signal $\lambda_{b2}$ and couple it to the second matrix switch 262. The second matrix switch 262 could then transmit the Gigabit Ethernet signal $\lambda_{b2}$ to a Gigabit Ethernet analyzer (which could be represented by item 250a). Similarly, an ATM signal (which could be represented by $\lambda_{z7}$) could be directed to an ATM analyzer (which could be represented by item 250z) and so on.

The first matrix switch 260 and the second matrix switch 262 would be controlled in accordance with the manufacturer's specifications for the particular type of matrix switch employed. Such control could include automatic control or manual control, depending upon the specific application.

Illustrative examples of certain elements disclosed in the embodiments presented above include the following: the optical fibers employed could be 9 micron optical communications fiber; the beam splitter could be a low excess loss 90/10 coupler/splitter available from Gould Electronics Inc., Fiber Optics Div., 1121 Benfield Blvd., Millersville, Md. 21108-2540; the matrix switches could be made from one or more DiCon Vx500 1xN optical switches, available from DiCon Fiberoptics, Inc., 1331 Eighth Street, Berkeley, Ca. 94710 and controlled by a control entity of the same type used in a GP700 General Purpose Fiberoptic Switch enclosure that is also available from DiCon Fiberoptics, Inc. Examples of analyzers that could be used with the invention include: Broad Band Test Systems available from Adtech, Inc., 3465 Waialae Ave., Suite 200, Honolulu, Hi. 96816; many other asynchronous transfer mode (ATM) analyzers, for example a Hewlett-Packard Model 75,000. Although certain specific elements are disclosed in this paragraph, it is understood that these elements are disclosed for the added convenience of the practitioner of the invention and that many other elements may be employed without departing from the scope of the invention. The claims are not to be construed so as to be limited to any of the elements, or combinations thereof, disclosed in this paragraph.

Figure 5:
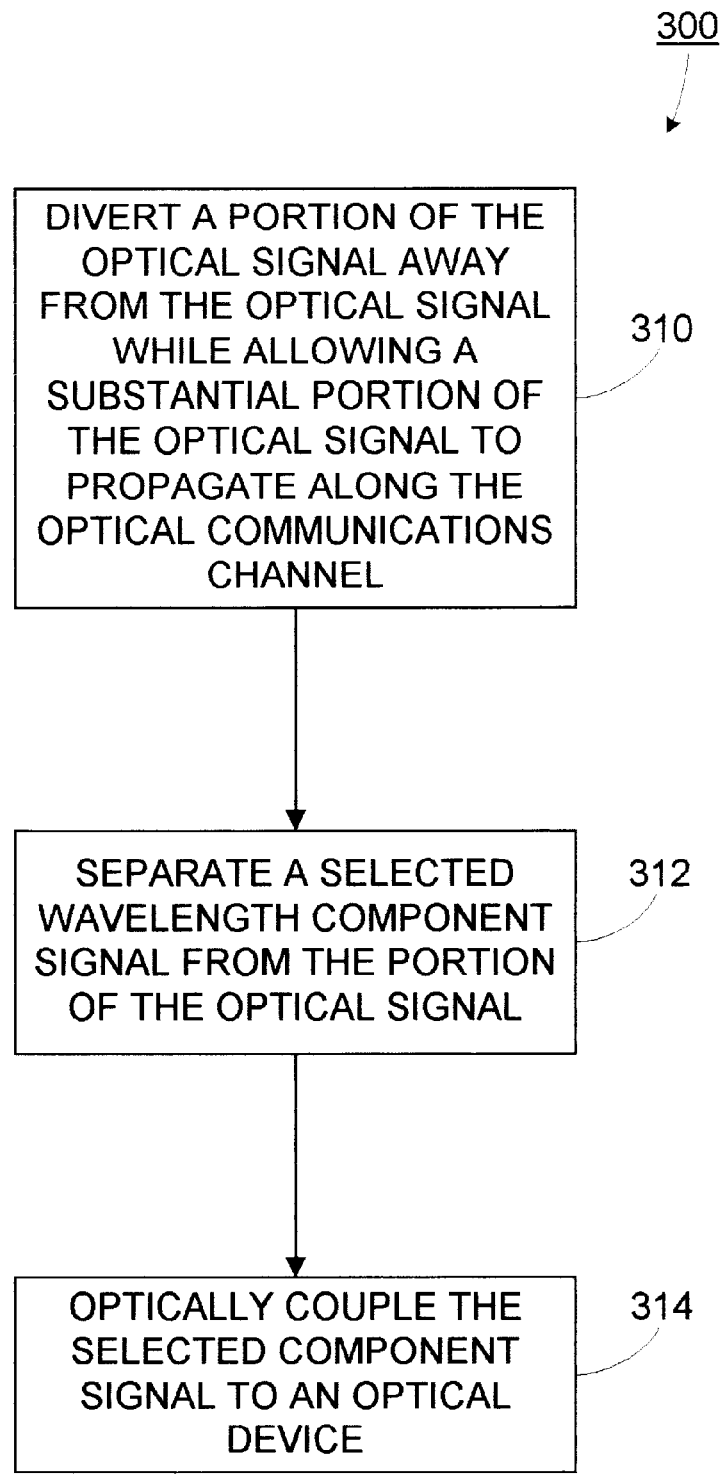
FIG. 5 is a flow diagram showing the steps executed by the method of the invention.

As shown in FIG. 5, in the method 300 of the invention, a component signal of an optical signal having a plurality of wavelength component signals is provided to an optical device. First, a portion of the optical signal is diverted 310 from the optical signal while allowing a substantial portion of the optical signal to propagate along an optical communications channel. A selected wavelength component signal is separated 312 from the portion of the optical signal. Then, the selected component signal is optically coupled 314 to an optical device, such as an optical signal analyzer.

Although the above-described embodiments employ dense wavelength division multiplexed systems, it is understood that the scope of the invention extends to non-dense wavelength division multiplexed (WDM) systems as well.

In the above-described embodiments, multiple units of a plurality of units are designated with an item number and a letter between "a" through "z" (for example, a plurality of communication systems 120a–z and 220a–z) and may be further designated with a number "1" through "n" (for example, a plurality of signals $\lambda_{1-n}$ and $\lambda_{a1-an}$). It is understood that such designations are for illustrative purposes only and that they designate a plurality that may include any arbitrary number of items. In such cases, it is not intended that the scope of the invention be limited to having a plurality of items corresponding in number exactly to the numbers or letters actually shown.

The above described embodiments are given as an illustrative examples only. It will be readily appreciated that many deviations may be made from the specific embodiment disclosed in this specification without departing from the invention. Accordingly, the scope of the invention is to be determined by the claims below rather than being limited to the specifically described embodiment above.

What is claimed is:

1. A system for diverting an optical component signal from a plurality of multiplexed optical signals, comprising:
   a. a plurality of optical communications units, wherein each of the plurality of optical communications units comprises:
      i. an optical communications channel, including a first portion and a second portion, through which may be transmitted a multiplexed optical signal having a plurality of component signals, wherein each component signal lies within a different optical bandwidth;
      ii. a branch optical channel comprising a first section and a second section; and
      iii. a signal diverter that optically couples the first portion of the communications channel to the second portion of the communications channel and that directs a diverted portion of the multiplexed optical signal into the first section of the branch optical channel and that allows a non-diverted portion of the multiplexed optical signal to propagate into the second portion of the optical communications channel;
   b. a first matrix switch, optically coupled to each of the first sections of each of the branch optical channels of the plurality of optical communications units, the first matrix switch configured to select a first branch of a branch optical channel of one of the plurality of optical communications units;
   c. an optical wavelength separator, optically coupled to the first matrix switch, the first matrix switch configured to optically couple the selected first section of the branch optical channel of the one of the plurality of optical communications units to the optical wavelength separator, and wherein the optical wavelength separator separates a selected component signal from the diverted portion of the optical signal and optically couples the selected component signal into the second section of the branch optical channel; and
   d. a port optically coupled to the second section of the branch optical channel, through which an optical device may be optically coupled to the second section of the branch optical channel.

2. The apparatus of claim 1, wherein each of the plurality of optical communications channels comprises an optical fiber.

3. The apparatus of claim 1, wherein each of the plurality of branch optical channels comprises an optical fiber.

4. The apparatus of claim 1, wherein each of the plurality of signal diverters comprises a beam splitter.

5. The apparatus of claim 1, wherein the optical wavelength separator comprises an optical add-drop multiplexer.

6. The apparatus of claim 1, wherein the optical device comprises an optical signal analyzer.

7. The apparatus of claim 1, further comprising:
   a plurality of first optical wavelength division multiplexers, wherein each of the plurality of optical wavelength division multiplexers is optically coupled to the first portion of a respective optical communications channel so as to optically couple the plurality of optical component signals transmitted through the respective optical communications channel into the first portion of the respective optical communications channel; and
   b. a plurality of second optical wavelength division multiplexers, wherein each of the plurality of second optical wavelength division multiplexers is optically coupled to the second portion of the respective optical communications channel so as to separate the plurality of optical component signals transmitted through the respective optical communications channel into a plurality of discrete signals.

8. A system for diverting an optical component signal from a multiplexed optical signal, comprising:
   a. an optical communications unit, comprising:
      i. an optical communications channel, including a first portion and a second portion, through which maybe transmitted a multiplexed optical signal having a plurality of component signals, wherein each component signal lies within a different optical bandwidth;
      ii. a branch optical channel comprising a first section and a second section; and
      iii. a signal diverter that optically couples the first portion of the communications channel to the second portion of the communications channel and that directs a diverted portion of the multiplexed optical signal into the first section of the branch optical channel and that allows a non-diverted portion of the multiplexed optical signal to propagate into the second portion of the optical communications channel;
   b. an optical wavelength separator, optically coupled to the first section of the branch optical channel, that separates a selected component signal from the diverted portion of the optical signal and that optically couples the selected component into the second section of the branch optical channel;
   c. a port optically coupled to the second section of the branch optical channel, through which an optical device may be optically coupled to the second section of the branch optical channel;
   d. a plurality of optical communications units, each unit including an optical communications channel, a branch optical channel and a signal diverter that diverts a portion of an optical signal transmitted through the optical communications channel to the branch optical channel; and
   e. a first matrix switch, optically coupled to each of the branch optical channels of the plurality of optical communications units and optically coupled to the optical wavelength separator, the matrix switch configured to optically couple a selected branch optical channel to the optical wavelength separator.

9. The apparatus of claim 8, further comprising:
   a. a plurality of optical wavelength separators, each optically coupled to the first matrix switch;
   b. a second matrix switch, optically coupled to each of the plurality of optical wavelength separators and having a plurality of ports to which a plurality of optical devices may be optically coupled, the second matrix switch being capable of optically coupling a selected optical wavelength separator of the plurality of optical wavelength separators to a selected optical device of the plurality of the optical devices.

10. The apparatus of claim 8, wherein each of the optical communications channels comprises an optical fiber.

11. The apparatus of claim 8, wherein each of the branch optical channels comprises an optical fiber.

12. The apparatus of claim 8, wherein each of the signal diverters comprises a beam splitter.

13. The apparatus of claim 8, wherein the optical wavelength separator comprises an optical add-drop multiplexer.

14. The apparatus of claim 8, wherein the optical device comprises an optical signal analyzer.

15. The apparatus of claim 8, comprising:
   a. a plurality of first optical wavelength division multiplexers, wherein each of the plurality of first optical wavelength division multiplexers is optically coupled to the first portion of a respective optical communications channel so as to optically couple the plurality of optical component signals transmitted through the respective optical communications channel into the first portion of the respective optical communications channel; and
   b. a plurality of second optical wavelength division multiplexers, wherein each of the plurality of second optical division wavelength division multiplexers is optically coupled to the second portion of the respective optical communications channel so as to separate the plurality of optical component signals transmitted through the respective optical communications channel into a plurality of discrete signals.

16. A system for diverting an optical component signal from a plurality of multiplexed optical signals, comprising:
   a. a plurality of first means for transmitting the plurality of multiplexed optical signals, wherein each of the plurality of multiplexed optical signals includes a plurality of optical component signals of different bandwidths;
   b. a plurality of second means for transmitting a plurality of multiplexed optical signals;
   c. a plurality of means for diverting a portion of each of the plurality of multiplexed optical signals from the plurality of first transmitting means to a corresponding one of the plurality of second transmitting means;
   d. means, optically coupled to each of the plurality of second transmitting means, for selecting the diverted portion from one of the plurality of multiplexed optical signals;
   e. means, optically coupled to the selecting means, for separating the optical component signal from the selected diverted portion of the one of the plurality of multiplexed optical signals; and
   f. means for optically coupling the optical component signal from the separating means to an optical device.

17. A system for diverting a plurality of optical component signals from a plurality of multiplexed optical signals, comprising:
   a. a plurality of first means for transmitting the plurality of multiplexed optical signals, wherein each of the plurality of multiplexed optical signals includes a plurality of optical component signals of different bandwidths;
   b. a plurality of second means for transmitting a plurality of multiplexed optical signals;
   c. a plurality of means for diverting a portion of each of the plurality of multiplexed optical signals from the plurality of first transmitting means to a corresponding one of the plurality of second transmitting means;
   d. means, optically coupled to each of the plurality of second transmitting means, for switching each of the diverted portions from the plurality of multiplexed optical signals;
   e. a plurality of means, each optically coupled to the switching means, for separating an optical component signal from each of the respective switched diverted portions of the plurality of multiplexed optical signals; and
   f. means for optically coupling the optical component signal from each of the plurality of separating means to a respective optical device of a plurality of optical devices.

* * * * *